(12) United States Patent
Doi et al.

(10) Patent No.: US 7,214,260 B2
(45) Date of Patent: *May 8, 2007

(54) INK SET FOR INK JET RECORDING, INK JET RECORDING METHOD AND INK JET RECORDING APPARATUS

(75) Inventors: Takatsugu Doi, Ebina (JP); Chizuru Koga, Ebina (JP); Takashi Ogino, Ebina (JP); Kiyoshi Hosoi, Ebina (JP); Tsukasa Matsuda, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 288 days.

This patent is subject to a terminal disclaimer.

(21) Appl. No.: 10/860,063

(22) Filed: Jun. 4, 2004

(65) Prior Publication Data
US 2004/0244645 A1   Dec. 9, 2004

(30) Foreign Application Priority Data
Jun. 5, 2003   (JP)   ............................. 2003-160550

(51) Int. Cl.
*C09D 11/02*   (2006.01)
*B41J 2/01*   (2006.01)

(52) U.S. Cl. ................. 106/31.58; 106/31.86; 106/31.46; 106/31.47; 106/31.49; 106/31.76; 106/31.77; 106/31.78; 347/100

(58) Field of Classification Search ............. 106/31.58, 106/31.86, 31.46, 31.47, 31.49, 31.76, 31.77, 106/31.78; 347/100
See application file for complete search history.

(56) References Cited

U.S. PATENT DOCUMENTS
4,325,735 A  *  4/1982  Ohta et al. ................ 106/31.49
(Continued)

FOREIGN PATENT DOCUMENTS
JP         A 63-265681         11/1988
(Continued)

OTHER PUBLICATIONS
U.S. Appl. No. 10/930,866, Takatsugu Doi, filed Sep. 1, 2004.
(Continued)

*Primary Examiner*—Helene Klemanski
(74) *Attorney, Agent, or Firm*—Oliff & Berridge PLC

(57) ABSTRACT

The present invention provides an ink set for ink jet recording using at least two kinds of liquids. The first liquid contains at least a colorant, a water soluble solvent and water, and the second liquid contains at least a compound represented by the following general formula (1), a water soluble solvent and water. The present invention also provides an ink jet recording apparatus comprising a recording head from which the ink set for ink jet recording is ejected, and an ink jet recording method by which an image is formed by applying the first and second liquids on a recording medium so as to contact each other General formula (1)

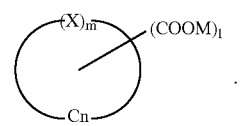

23 Claims, 3 Drawing Sheets

U.S. PATENT DOCUMENTS

| | | | |
|---|---|---|---|
| 5,198,023 A | | 3/1993 | Stoffel |
| 5,320,668 A | * | 6/1994 | Shields et al. ............ 106/31.28 |
| 5,518,534 A | * | 5/1996 | Pearlstine et al. ....... 106/31.75 |
| 5,536,306 A | * | 7/1996 | Johnson et al. .......... 106/31.49 |
| 5,555,008 A | * | 9/1996 | Stoffel et al. ................ 347/100 |
| 5,679,143 A | * | 10/1997 | Looman ................. 106/31.43 |
| 5,976,231 A | | 11/1999 | Schwarz |
| 6,022,908 A | | 2/2000 | Ma et al. |
| 6,048,388 A | | 4/2000 | Schwarz |
| 6,367,923 B1 | | 4/2002 | Koitabashi |
| 6,573,405 B1 | | 6/2003 | Abbott et al. |
| 7,048,452 B2 | | 5/2006 | Malagrino, Jr. |
| 2004/0035293 A1 | | 2/2004 | Davis, Jr. |
| 2005/0166792 A1 | * | 8/2005 | Doi ........................ 106/31.27 |
| 2005/0183628 A1 | | 8/2005 | Lchmann et al. |
| 2005/0264630 A1 | * | 12/2005 | Doi ............................ 347/100 |
| 2006/0023042 A1 | * | 2/2006 | Doi ............................ 347/100 |
| 2006/0066661 A1 | * | 3/2006 | Yamashita et al. ............ 347/21 |
| 2006/0139426 A1 | * | 6/2006 | Doi ............................ 347/100 |
| 2006/0203055 A1 | * | 9/2006 | Doi ............................. 347/96 |

FOREIGN PATENT DOCUMENTS

| | | |
|---|---|---|
| JP | 08-072233 A | 3/1996 |
| JP | B2 2667401 | 6/1997 |
| JP | 9176531 A | 7/1997 |
| JP | B2 2711888 | 10/1997 |
| JP | 3033069 B2 | 4/2000 |
| JP | A 2000-109735 | 4/2000 |
| JP | A 2001-2947488 | 10/2001 |
| JP | 2004-339346 A | 12/2004 |

OTHER PUBLICATIONS

U.S. Appl. No. 11/049,129, Takatsugu Doi, filed Feb. 2, 2005.
U.S. Appl. No. 11/209,112, Takatsugu Doi, filed Aug. 22, 2005.

* cited by examiner

PRINTED PATTERN B

INK SET FOR INK JET RECORDING, INK JET RECORDING METHOD AND INK JET RECORDING APPARATUS

CROSS-REFERENCE TO RELATED APPLICATIONS

This application claims priority under 35 USC 119 from Japanese patent document, No. 2003-160550, the disclosure of which is incorporated by reference herein.

BACKGROUND OF THE INVENTION

1. Field of the Invention

The present invention relates to an ink set for ink jet recording, an ink jet recording method and an ink jet recording apparatus.

2. Description of the Related Art

Ink jet systems for ejecting an ink through an ink ejection port formed of a nozzle, slit or porous film have been used for many printers since a compact printer therefor is compact and inexpensive. In particular, among ink jet systems, a piezo ink jet system for ejecting an ink by taking advantage of deformation of a piezoelectric element and a thermal ink jet system for ejecting an ink by taking advantage of boiling of the ink by thermal energy are excellent in high-resolution and high-speed printing.

One currently important object of ink jet printers is high speed and high quality printing of images on a regular paper sheet. For attaining this object, Japanese Patent No. 2667401 proposes a method comprising the steps of allowing a liquid containing a cationic group-bearing compound to adhere on a recording medium, allowing the liquid to permeate into the recording medium, and forming an image by allowing an anionic dye-containing ink to adhere on the surface of the recording medium immediately after the liquid has permeated into the recording medium and disappeared from the surface thereof. However, image density may be insufficient in this method when the drying time of the ink is shortened, and long-term ejectability may be insufficient when the images are printed using a small volume of drops.

Japanese Patent Application Laid-Open (JP-A) No. 2001-294788 proposes a color ink set for attaining high speed drying, high optical density and high image quality, wherein a black ink contains water and a water-soluble solvent, the drying time of the black ink on a regular paper sheet is not more than 5 seconds, each of color inks contain colorants, water, a water-soluble solvents and a coagulant for coagulating the components in the black ink, and the permeation time of the color inks into the regular paper sheet is not more than 5 seconds. Although optical density, feathering and intercolor bleeding are excellent when pigments are used for colorants of the color inks in this method, stable long-term storability of images may not always be sufficient since the ink contains the coagulant. It has also been a problem that electrolytes and multivalent metal salts that are usually used as the coagulant have too strong of an effect as the coagulant.

JP-A Nos. 63-265681 and 2000-109735, and Japanese Patent No. 2711888 have proposed inks containing nitrogen-containing five-membered heterocyclic keto acids such as pyrrolidone carboxylic acid or salts thereof for improving ejection characteristics. The object of these methods is to improve ejectability by taking advantage of a humectant effect of the nitrogen-containing five-membered heterocyclic keto acid. However, image quality has not always been compatible with ejection characteristics when a liquid that contains the nitrogen-containing five-membered heterocyclic keto acid and the liquid that contains colorants are used together as in the present invention.

It has been impossible, in the conventional methods, to simultaneously satisfy optical density, feathering, intercolor bleeding, drying time and long-term ejectability.

SUMMARY OF THE INVENTION

The present invention has been made in view of the above circumstances.

A first aspect of the present invention is an ink set for ink jet recording comprising at least a first liquid and a second liquid, wherein the first liquid contains at least a colorant, a water soluble solvent and water, and the second liquid contains at least a compound represented by the following general formula (1), a water soluble solvent and water:

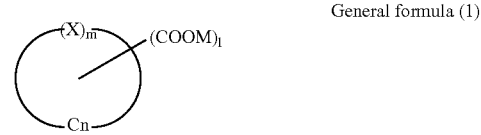

General formula (1)

in which X represents O, CO, NH, NR, S or $SO_2$; R represents an alkyl group; M represents a hydrogen atom, an alkali metal or an amine; l represents an integer from 1 to 5; m represents 1 or 2; and n represents an integer from 3 to 7.

A second aspect of the present invention is to provide an ink jet recording method using an ink set for ink jet recording comprising at least two kinds of liquids of a first liquid containing at least a colorant, a water soluble solvent and water, and a second liquid containing at least a compound represented by the general formula (1), a water soluble solvent and water, wherein an image is formed by applying the first and second liquids on a recording medium so as to contact each other.

A third aspect of the present invention is to provide an ink jet recording apparatus comprising a recording head for ejecting each liquid in an ink set for ink jet recording, wherein the ink set for ink jet recording comprises at least a first liquid and second liquid, the first liquid containing at least a colorant, a water soluble solvent and water, and the second liquid containing at least a compound represented by the general formula (1) above, a water soluble solvent and water.

DETAILED DESCRIPTION OF THE INVENTION

Figure 1:
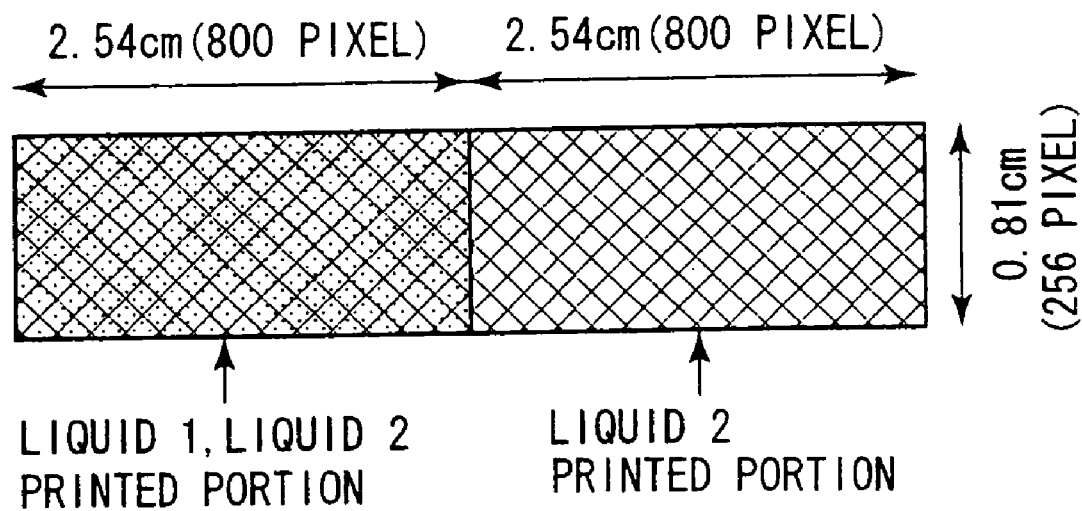
FIG. 1 shows a printing pattern for evaluation in an example.

The present invention provides, in the first to third embodiments, an ink set for ink jet recording excellent in optical density, feathering, intercolor bleeding, drying time and long-term ejectability, and an ink jet recording method and ink jet recording apparatus using the ink set.

As other embodiments of the invention, fourth to twenty-three embodiments will be described below.

The fourth embodiment of the present invention is an ink set for ink jet recording according to the first embodiment, wherein the compound represented by the general formula (1) is at least one selected from the group consisting of pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives and salts of these compounds.

The fifth embodiment of the present invention is an ink set for ink jet recording according to the first embodiment, wherein a pH of the second liquid is not less than 2.5 and not more than 8.0.

The sixth embodiment of the present invention is an ink set for ink jet recording according to the first embodiment, wherein the second liquid contains the compound represented by the general formula (1) in a proportion of not less than 0.01% by mass and not more than 30% by mass.

The seventh embodiment of the present invention is an ink set for ink jet recording according to the first embodiment, wherein the colorant in the first liquid is a pigment, which is at least one selected from the group consisting of a pigment dispersed with a polymer dispersant, a self-dispersible pigment and a pigment coated with a resin.

The eighth embodiment of the present invention is an ink set for ink jet recording according to the first embodiment, wherein the first liquid contains a resin having carboxylate groups.

The ninth embodiment of the present invention is an ink set for ink jet recording according to the first embodiment, wherein the second liquid contains at least one colorant selected from the group consisting of a dye, a pigment having sulfonic acid or a sulfonate salt on a surface thereof, and a self-dispersible pigment.

The tenth embodiment of the present invention is an ink set for ink jet recording according to the first embodiment, wherein a volume average particle diameter of the colorant in the first liquid is not less than 30 nm and not more than 250 nm.

The eleventh embodiment of the present invention is an ink set for ink jet recording according to the first embodiment, wherein a surface tension of the first liquid is not less than 20 mN/m and not more than 60 mN/m.

The twelfth embodiment of the present invention is an ink set for ink jet recording according to the first embodiment, wherein a surface tension of the second liquid is not less than 20 mN/m and not more than 45 mN/m.

The thirteenth embodiment of the present invention is an ink set for ink jet recording according to the first embodiment, wherein a viscosity of each of the first and second liquids is not less than 1.2 mPa·s and not more than 8.0 mPa·s.

The fourteenth embodiment of the present invention is an ink set for ink jet recording according to the first embodiment, wherein a number of particles having a particle diameter of not less than 5 µm in a mixed liquid of equal amounts of the first and second liquids is not less than 1,000 particles/µL.

The fifteenth embodiment of the present invention is an ink jet recording method according to the second embodiment, wherein the second liquid contains at least one colorant selected from the group consisting of a dye, a pigment having sulfonic acid or a sulfonate salt on a surface thereof, and a self-dispersible pigment.

The sixteenth embodiment of the present invention is an ink jet recording method according to the second embodiment, wherein the colorant in the first liquid is a pigment, and the pigment is at least one selected from the group consisting of a pigment dispersed with a polymer dispersant, a self-dispersible pigment and a pigment coated with a resin.

The seventeenth embodiment of the present invention is an ink jet recording method according to the second embodiment, wherein the first liquid and the second liquid are applied on a recording medium in a quantity of not more than 25 ng per one drop.

The eighteenth embodiment of the present invention provides an ink jet recording method according to the second embodiment, wherein a mass ratio of amounts of the first liquid and the second liquid applied for forming one pixel is in a range of 1:10 to 10:1.

The nineteenth embodiment of the present invention provides an ink jet recording apparatus according to the third embodiment, wherein the first and second inks are applied on a recording medium so as to contact each other.

The twentieth embodiment of the present invention provides an ink jet recording apparatus according to the third embodiment, wherein the second liquid contains at least one colorant selected from the group consisting of a dye, a pigment having at least sulfonic acid and a sulfonate salt as functional groups on a surface thereof, and a self-dispersible pigment.

The twenty-first embodiment of the present invention provides an ink jet recording apparatus according to the third embodiment, wherein the colorant in the first liquid is a pigment, and the pigment is at least one selected from the group consisting of a pigment dispersed with a polymer dispersant, a self-dispersible pigment and a pigment coated with a resin.

The twenty-second embodiment of the present invention provides an ink jet recording apparatus according to the third embodiment, wherein the first and second liquids are applied on a recording medium in a quantity of not more than 25 ng per one drop.

The twenty-third embodiment of the present invention provides an ink jet recording apparatus according to the third embodiment, wherein a mass ratio of amounts of the first liquid and the second liquid applied for forming one pixel is in the range of 1:10 to 10:1.

The optical density, feathering and intercolor bleeding could be improved in the present invention by printing so that the first liquid and the second liquid containing the compound represented by the general formula (1) contact each other. Although the mechanism by which the above-described phenomena occurs is not entirely clear, it is conjectured that the compound represented by the general formula (1) has an action for coagulating the first liquid, and a colorant included in the first liquid is able to be held on the surface of the recording medium with a high density by printing so that the two kinds of the liquids contact each other on the recording medium.

It is conjectured that the compound represented by the general formula (1) is suitable as the material for coagulating the first liquid by the following three reasons.

<1> The compound represented by the general formula (1) is acidic since the carboxylic group thereof has a large dissociation constant. Accordingly, dissociation of the functional group on the surface of the colorant included the first liquid may be inhibited by contacting the two liquids each other when a colorant having an anionic surface functional groups is used in the first liquid, and the colorant is coagulated.

<2> The compound represented by the general formula (1) may function as a pH buffer. Accordingly, pH variation due to the changes of the hydrogen ion concentration is small among a specified acidic pH range. Consequently, the pH is maintained at an acidic side when the first and second liquids are mixed to enable the colorant in the first liquid to be effectively coagulated.

<3> The compound represented by the general formula (1) may function as an electrolyte. Accordingly, an electrostatic repulsion force among the pigment particles is weakened by using the pigment as the colorant in the first liquid, and coagulation of the pigment is accelerated.

On the other hand, the second liquid of the present invention is excellent in long-term ejectability, because the protective film of a heater is hardly broken by using the compound represented by the general formula (1), although multivalent metal salts used as the coagulant tends to break the protective film of the heater to cause break of the wire of the heater.

The first liquid will be described below.

The first liquid contains at least a colorant, a water soluble solvent and water.

While either a dye or a pigment may be used in the first liquid, the pigment is particularly preferable because the pigment is more readily coagulated than the dye when the first liquid is mixed with the second liquid. A pigment dispersed with a polymer dispersant, a self-dispersible pigment and a pigment coated with a resin are preferable.

The pigment used in the present invention may be either an organic pigment or inorganic pigment. The black pigment available includes carbon black pigments such as furnace black, lamp black, acetylene black and channel black. Specified red, green, blue, brown and white pigments as well as metallic luster pigments such as gold and silver color pigments, colorless or light color extenders, and plastic pigments may be used in addition to the black pigment and three primary color pigments of cyan, magenta and yellow pigments. It is also possible, in the present invention, to use particles prepared by adhering a dye or pigment on the surface of a silica, alumina or polymer beads cores, insolubilized lakes of dyes, colored emulsion and colored latex as the pigment. The pigment may be a novel synthetic pigment for use in the present invention.

Specific examples of the pigment used in the present invention include Raven 7000, Raven 5750, Raven 5250, Raven 5000 Ultra II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Chemicals Company); Regal 400R, Regal 330R, Regal 660R, Mogul L, Black Pearls L, Monarch 700, Monarch 800, Monarch 880, Monarch 900, Monarch 1000, Monarch 1100, Monarch 1300 and Monarch 1400 (manufactured by Cabot Corporation): Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by manufactured by Degussa Co.): and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

While examples of the cyan color include C.I. Pigment Blue-1, -2, -3, -15, -15:1, -15:2, -15:3, -15:4, -16, -22 and -60, the pigments are not restricted thereto.

While examples of the magenta color include C.I. Pigment Red-5, -7, -12, -48, -48:1, -57, -112, -122, -123, -146, -168, -184 and -202, the pigments are not restricted thereto.

While examples of the yellow color include Pigment Yellow-1, -2, -3, -12, -13, -14, -16, -17, -73, -74, -75, -83, 93, -95, -97, -98, -114, 128, -129, -138, -151, -154 and -180, the pigments are not restricted thereto.

The self-dispersible pigment in water used in the present invention refers to the pigment having many water-solubilizing groups on the surface of the pigment that is able to be stably dispersed in water without adding any polymer dispersant. The self-dispersible pigment in water is practically obtained by applying surface modification treatments such as an acid or a base treatment, a coupling agent treatment, a polymer graft treatment, a plasma treatment or a redox treatment on so-called usual pigments.

In addition to the surface-modified pigments described above, commercially available pigments such as Cab-o-jet-200, Cab-o-jet-300, IJX-253, IJX -266, IJX -273, IJX -444 and IJX -55 (manufactured by Cabot Corporation), and Microjet Black CW-1 and CW-2 (manufactured by Orient Chemical Industries, Ltd.) may also be used as the self-dispersible pigment in water.

When the colorant used in the first liquid is the self-dispersible pigment, the colorant preferably has carboxylic groups as the functional groups on the surface thereof. Since carboxylic acid has a small dissociation constant, dissociation thereof may be suppressed by the compound represented by the general formula (1) to enable coagulation of the pigment to be accelerated.

When the colorant used in the first liquid has the sulfonate group on the surface thereof, a polymer compound having carboxylate groups is preferably added in addition to the colorant. Since the colorant having the sulfonate group is hardly coagulated, the optical density, feathering and intercolor bleeding are liable not to be improved. On the other hand, the polymer compound is insolubilized by mixing the two liquids when the polymer compound having the carboxylate group is added. Consequently, the optical density, feathering and intercolor bleeding are supposed to be improved since the pigment is coagulated by being occluded in the polymer compound.

The pigment coated with a resin may be used as the colorant. Such pigment is called as microcapsule pigments, which include commercially available microcapsule pigments manufactured by Dainippon Ink & Chemicals, Inc. and Toyo Ink MFG Co., Ltd. as well as microcapsule pigments prepared for use in the present invention.

Either water-soluble dyes or dispersion dyes may be used in the present invention. Specific examples of the water-soluble dye include C.I. Direct Black-2, -4, -9, -11, -17, -19, -22, -32, -80, -151, -154, -168, -171, -194 and -195; C.I. Direct Blue-1, -2, -6, -8, -22, -34, -70, -71, -76, -78, -86, -112, -142, -165, -199, -200, -201, -202, -203, -207, -218, -236, -287 and -307; C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189 and 227; C.I. Direct Yellow-1, -2, -4, -8, -11, -12, -26, -27, -28, -33, -34, -41, -44, -48, -58, -86, -87, -88, -132, -135, -142, -144 and -173; C.I. Food Black-1 and -2; C.I. Acid Black-1, -2, -7, -16, -24, -26, -28, -31, -48, -52, -63, -107, -112, -118, -119, -121, -156, -172, -194 and -208; C.I. Acid Blue-1, -7, -9, -15, -22, -23, -27, -29, -40, -43, -55, -59, -62, -78, -80, -81, -83, -90, -102, -104, -111, -185, -249 and -254; C.I. Acid Red-1, -4, -8, -13, -14, -15, -18, -21, -26, -35, -37, -52, -110, -144, -180, -249, -257 and -289; and C.I. Acid Yellow-1, -3, -4, -7, -11, -12, -13, -14, -18, -19, -23, -25, -34, -38, -41, -42, -44, -53, -55, -61, -71, -76, -78, -79 and -122.

Specific examples of the dispersion dye include C.I. Disperse Yellow-3, -5, -7, -8, -42, -54, -64, -79, -82, -83, -93, -100, -119, -122, -126, -160, -184:1, -186, -198, -204 and 224; C.I. Disperse Orange-13, -29, -31:1, -33, -49, -54, -66, -73, -119 and -163; C.I. Disperse Red-1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356 and -362; C.I. Disperse Violet-33; C.I. Disperse Blue-14, -26, -56, -60, -73, -87, -128, -143, -154, -165, -165:1, -176, -183, -185, -201, -214, -224, -257, -287, -354, -365 and -368; and C.I. Disperse Green-6:1 and -9.

The colorant is used in a proportion in the range of not less than 0.1% by mass and not more than 20% by mass, preferably not less than 1% by mass and not more than 10% by mass relative to the total mass of the first liquid in the present invention. Sufficient optical density may be not able to be obtained when the proportion of the colorant in the liquid is less than 0.1% by mass, while ejection characteristics may become unstable when the proportion of the colorant is larger than 20% by mass.

A polymer dispersant may be used in the present invention for dispersing the pigment in the first liquid. The polymer dispersant may be also used when the self-dispersible pigment in water is used. The polymer dispersant available includes nonionic compounds, anionic compounds, cationic compounds and amphoteric compounds.

Examples of the polymer dispersant include copolymers of monomers having an ethylenic α,β-unsaturated group. Examples of the monomer having the ethylenic α,β-unsaturated group include acrylic acid, methacrylic acid, crotonic acid, itaconic acid, itaconate monoester, maleic acid, maleic monoester, fumaric acid, fumaric monoester, vinyl sulfonate, styrene sulfonate, vinylnaphthalene sulfonate, vinyl alcohol, acrylamide, methacryloxyethyl phosphate, bis-methacryloxyethyl phosphate, methacryloxyethylphenyl acid phosphate, ethyleneglycol dimethacrylate and diethyleneglycol dimethacrylate; styrene derivatives such as styrene, α-methylstyrene and vinyltoluene; and vinylcyclohexane, vinylnapthalene, vinylnapthalene derivatives, alkyl acrylate, phenyl acrylate, alkyl methacrylate, phenyl methacrylate, cycloalkyl methacrylate, alkyl crotonate, dialkyl itaconate and dialkyl maleate.

The polymers obtained by homopolymerization of the monomer having the ethylenic α,β-unsaturated group, or copolymers obtained by copolymerization of a plurality of the monomers having the ethylenic α,β-unsaturated groups can be used as the polymer dispersant. Specific examples thereof include styrene—styrene sulfonate copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer.

The polymer dispersant used in the present invention preferably has a weight average molecular weight of 2,000 to 15,000. The pigment may be not able to be stable-dispersed when the molecular weight of the polymer dispersant is less than 2,000, while ejection characteristics may be deteriorated when the molecular weight exceeds 15,000 due to a high viscosity of the liquid. The weight average molecular weight is more preferably 3,500 to 10,000.

The polymer dispersant is used by adding in the liquid in the range of not less than 0.01% by mass and not more than 3% by mass. Ejection characteristics may be unstable due to a high viscosity of the liquid when the proportion of addition exceeds 3% by mass, while stable dispersability of the pigment may be impaired when the proportion is less than 0.01% by mass. The proportion of addition of the polymer dispersant is preferably not less than 0.05% by mass and not more than 2.5% by mass, more preferably not less than 0.1% by mass and not more than 2% by mass.

The volume average particle diameter of the colorant particles in the first liquid is preferably not less than 30 nm and not more than 250 nm. The volume average particle diameter of the colorant refers to the particle diameter of the colorant itself, or the particle diameter of the colorant including additives such as the dispersant adsorbed on the colorant particles. Micro-track UPA particle diameter analyzer 9340 (trade name, manufactured by Leeds & Northrup Co.) is used as the average particle diameter measuring apparatus in the present invention. The average particle diameter is measured according to a predetermined measuring method by filling 4 ml of the ink in a measuring cell. The parameters required for measurement are the viscosity of the ink and the density of the pigment.

The volume average particle diameter is preferably not less than 50 nm and not more than 200 nm, more preferably not less than 75 nm and not more than 175 nm. Optical density may be decreased when the volume average particle diameter of the particles in the liquid is less than 30 nm, while stable storability cannot be ensured when the volume average particle diameter exceeds 250 nm.

The water-soluble organic solvents used in the present invention are polyhydric alcohols, derivatives of the polyhydric alcohols, nitrogen-containing solvents, alcohols and sulfur-containing solvents. Examples of the polyhydric alcohol include ethyleneglycol, diethyleneglycol, propyleneglycol, butyleneglycol, triethyleneglycol, 1,5-pentanediol, 1,2,6-hexanetriol and glycerin. Examples of the derivatives of the polyhydric alcohol include ethyleneglycol monomethylether, ethyleneglycol monomethylether, ethyleneglycol monobutylether, diethyleneglycol monomethylether, diethyleneglycol monoethylether, diethyleneglycol monobutylether, propyleneglycol monobutylether, dipropyleneglycol monobutylether, and diglycerin-ethylene oxide adduct. Examples of the nitrogen-containing solvent include pyrrolidone, N-methyl-2-pyrrolidone, cyclohexyl pyrrolidone and triethanolamine. Examples of the alcohol include ethanol, isopropyl alcohol, butyl alcohol and benzylalcohol; and examples of the sulfur-containing solvent include thiodiethanol, thiodiglycerol, sulfolane and dimethylsulfoxide. Propylene carbonate and ethylene carbonate may be also used.

The water-soluble organic solvents may be used single or as a mixture of at least two of them. The content of the water-soluble organic solvent used is not less than 1% by mass and not more than 60% by mass, preferably not less than 5% by mass and not more than 40% by mass. Sufficient optical density may be not able to be obtained when the content of the water-soluble organic solvent in the liquid is less than 1% by mass, while ejection characteristics of the liquid may become unstable due to a large viscosity of the liquid when the content is larger than 60% by mass.

The first liquid preferably contains a water-soluble resin or a water-insoluble resin, because the compound represented by the general formula (1) has an effect for coagulating the water-soluble resin or water-insoluble resin. The colorant is supposed to be occluded in the resin when the water-soluble or insoluble resin is coagulated to enhance the coagulation effect and improve the optical density, feathering and intercolor bleeding.

Compounds containing the carboxylate group is preferably used as the water-soluble resin and water-insoluble resin, because coagulation is supposed to be accelerated by the compound represented by the general formula (1) since the carboxylate group has a small dissociation constant. Adding the water-soluble or insoluble resin having the carboxylate group is particularly preferable when the sulfonate group-containing compound is used as the colorant. Preferable examples of such compound include styrene-acrylic acid copolymer, styrene-methacrylic acid copolymer, styrene-maleic acid copolymer and alkyl polyacrylate copolymer.

The water-soluble or insoluble resin is preferably added in a proportion of not less than 0.01% by mass and not more than 10% by mass, more preferably not less than 0.1% by mass and not more than 3% by mass, relative to the total quantity of the first liquid.

The surface tension of the first liquid is preferably not less than 20 mN/m and not more than 60 mN/m, more preferably not less than 20 mN/m and not more than 45 mN/m, and further preferably not less than 20 mN/m and not more than 35 mN/m. When the surface tension is less than 20 mN/m, the liquid may overflow onto the nozzle surface, whereby normal printing may be inhibitted, on the other hand, permeation may be retarded to prolong the drying time when the surface tension exceeds 60 mN/m.

The viscosity of the first liquid is preferably not less than 1.2 mPa·s and less than 8.0 mPa·s, more preferably not less than 1.5 mPa·s and not more than 6.0 mPa·s, and further preferably not less than 1.8 mPa·s and less than 4.5 mPa·s. Ejectability may be deteriorated when the viscosity of the first and second liquids is larger than 8.0 mPa·s, while long-term ejectability may be impaired when the viscosity is less than 1.2 mPa·s.

Water is added so that the surface tension and viscosity are within the ranges described above. While the quantity of added water is not particularly restricted, it is preferably not less than 10% by mass and not more than 99% by mass, more preferably not less than 30% by mass and not more than 80% by mass, relative to the total quantity of the first liquid.

The second liquid will be described below.

The second liquid contains at least a compound represented by the following general formula (1), a water-soluble solvent and water:

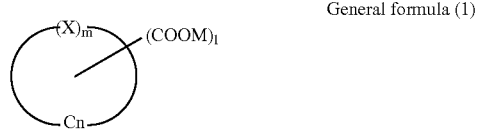

General formula (1)

wherein, in the formula, X represents O, CO, NH, NR, S or $SO_2$, preferably CO, NH, NR and O, more preferably CO, NH, O; R represents a substituted or unsubstituted alkyl group, preferably $CH_3$, $C_2H_5$ and $C_2H_4OH$; M represents a hydrogen atom, an alkali metal or amines, preferably H, Li, Na, K, monoethanolamine, diethanolamine and triethanolamine, more preferably H, Na and K, and further preferably a hydrogen atom; n is an integer of 3 to 7, preferably a heterocyclic ring having six-membered or five-membered, and more preferably a heterocyclic ring having a five-membered; m represents 1 or 2; and l represents an integer of 1 to 5. The compound represented by the general formula (1) may be a saturated ring or unsaturated ring.

The compounds represented by the general formula (1) specifically refer to the compounds having a furan, pyrrole, pyrroline, pyrrolidone, pyrone, pyrrole, thiophene, indole, pyridine or quinoline structure and having the carboxylate groups. Examples of them include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolid-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethylpyrrole-4-carboxylic acid, 2,4,5-trimethylpyrrole-3-propionic acid, 3-hydroxy-2-indole carboxylic acid, 2,5-dioxo-4-methyl-3-pyrroline-3-propionic acid, 2-pyrroline carboxylic acid, 4-hydroxyproline, 1-methylpyrrolidine-2-carboxylic acid, 5-carboxy-1-methylpyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid and 6-methoxy-4-quinoline carboxylic acid, and derivatives and salts thereof.

Preferably, the compounds represented by the general formula (1) are pyrrolidone carboxylic acid, pyrone carboxylic acid, pyrrole carboxylic acid, furan carboxylic acid, pyridine carboxylic acid, coumaric acid, thiophene carboxylic acid and nicotinic acid, and derivatives and salts thereof. More preferably, the compounds are pyrrolidone carboxylic acid, pyrone carboxylic acid, furan carboxylic acid and coumaric acid, and derivatives and salts thereof.

The compounds represented by the general formula (1) may be used single, or as a combination of at least two of them.

The amount of addition of the compound represented by the general formula (1) in the second liquid is preferably not less than 0.01% by mass and not more than 30% by mass, more preferably not less than 0.1% by mass and not more than 15% by mass, and further preferably not less than 0.25% by mass and not more than 10% by mass. Coagulation of the colorant when the second liquid contacts with the first liquid may be insufficient to deteriorate the optical density, feathering and intercolor bleeding when the amount of addition is less than 0.01% by mass. While ejection characteristics are deteriorated to fail the liquid to be normally ejected when the amount of addition exceeds 30% by mass.

The pH of the second liquid containing the compound represented by the general formula (1) is preferably not less than 2.5 and not more than 8.0, more preferably not less than 3.0 and not more than 7.0, and further preferably not less than 3.5 and not more than 6.0 in the present invention. The parts constituting the ink flow passageway of the print head may be dissolved and the print head may be damaged when the pH of the second liquid is less than 2.5. While coagulation of the colorant when the second ink contacts with the first ink may be insufficient when the pH of the second ink exceeds 8.0 to impair the optical density, feathering and intercolor bleeding.

The second liquid may contain the colorant. The colorant contained in the second liquid is preferably a dye, or a pigment having sulfonic acid or a sulfonate salt on the surface thereof, or a self-dispersible pigment. Since these colorants are hardly coagulated in the acidic region, the colorant may be suppressed from being coagulated by the compound represented by the general formula (1). Stable storability of the second liquid is improved by using the colorant as described above. The same colorant as described in the first liquid may be used as the dye, the pigment having sulfonic acid or a sulfonate salt on the surface thereof, and the self-dispersible pigment.

The volume average particle diameter of the colorant is preferably not less than 30 nm and not more than 250 nm, more preferably not less than 50 nm and not more than 200 nm, and further preferably not less than 75 nm and not more than 175 nm, when the colorant is used in the second liquid. The optical density may be decreased when the volume average particle diameter of the particles in the liquid is less than 30 nm, while stable storability cannot be assured when the diameter exceeds 250 nm.

The same water-soluble organic solvent may be used in the second liquid as in the first liquid. The content of the water-soluble organic solvent is not less than 1% by mass and not more than 60% by mass, preferably not less than 5% by mass and not more than 40% by mass. A sufficient optical density may be not able to be obtained when the content of the water-soluble organic solvent in the second liquid is less than 1% by mass. While the viscosity of the liquid may increase to render ejection characteristics unstable when the content is larger than 60% by mass.

The polymer dispersant used in the first liquid may be added in the second liquid as in the first liquid.

The surface tension of the second liquid is preferably not less than 20 mN/m and not more than 45 mN/m, more preferably not less than 20 mN/m and not more than 39 mN/m, and further preferably not less than 20 mN/m and not more than 35 mN/m. When the surface tension is less than 20 mN/m, the liquid may overflow onto the nozzle surface, whereby normal printing may be inhibitted, on the other hand, permeation may be retarded to prolong the drying time when the surface tension exceeds 45 mN/m.

The viscosity of the second liquid is preferably not less than 1.2 mPa·s and not more than 8.0 mPa·s, more preferably not less than 1.5 mPa·s and less than 6.0 mPa·s, and further preferably not less than 1.8 mPa·s and less than 4.5 mPa·s. Ejectability may be deteriorated when the viscosity of each of the first and the second liquids is larger than 8.0 mPa·s, while long-term ejectability may be deteriorated when the viscosity is less than 1.2 mPa·s.

Water is added in the range that permits the surface tension and viscosity to fall within the respective ranges as described above. While the amount of addition of water is not particularly restricted, it is not less than 10% by mass and not more than 99% by mass, more preferably not less than 30% by mass and not more than 80% by mass.

A coagulant that coagulates the components in the first liquid may be added in the second liquid in addition to the compound represented by the general formula (1).

Examples of the coagulant include alkali metal ions such as lithium ion, sodium ion and potassium ion; multivalent metal ions such as aluminum ion, barium ion, calcium ion, copper ion, iron ion, magnesium ion, manganese ion, nickel ion, tin ion, titanium ion and zinc ion; hydrochloric acid, hydrobromic acid, hydriodic acid, sulfuric acid, nitric acid, phosphoric acid and thiocyanic acid; and organic carboxylic acids such as acetic acid, oxalic acid, lactic acid, fumaric acid, citric acid, salicylic acid and benzoic acid; and organic sulfonic acids and salts thereof.

Specific examples of the salts include alkali metal salts such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and multivalent metal salts such as aluminum chloride, aluminum bromide, aluminum sulfate, aluminum nitrate, sodium aluminum sulfate, potassium aluminum sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartarate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate and zinc acetate.

The multivalent metal salts are particularly preferably used as the coagulant used in the present invention, because these metal salts have a large effect for coagulating the components in the first liquid. So the optical density, feathering and intercolor bleeding are improved.

The coagulants may be used single, or as a mixture of at least two of them in the present invention. The content of the coagulant used in the present invention is preferably not less than 0.01% by mass and not more than 15% by mass, more preferably not less than 0.1% by mass and not more than 10% by mass.

The number of coarse particles with a diameter of not less than 5 μm in the mixed solution of the first and second liquids is preferably not less than 1,000 particles/μL, preferable not less than 2,500 particles/μL, and further preferably not less than 5,000 particles/μL. The optical density may be decreased when the number of coarse particles with a diameter of not less than 5 μm in the mixed solution of the first and second liquids is less than 1,000 particles/μL.

The first and the second inks of the present invention are mixed in a mass ratio of 1:1. 2 μL of the mixed solution is sampled with stirring, and then the number of the coarse particles with a diameter of not less than 5 μm in the mixed solution is measured with Accusizer ™770 Optical Particle Sizer (trade name, manufactured by Particle Sizing Systems Co.). The density of the pigment is used as the density of the dispersed particles as a parameter of measurement. The density of the pigment can be determined by measuring the density of a pigment powder obtained by drying with heating using a hydrometer or a pycnometer.

The additives appropriately used in the first and the second liquids are described below.

A surfactant may be used in the first and the second liquids. Compounds having both a hydrophilic portion and a hydrophobic portion in the molecule may be effectively used as the surfactant in the present invention. Any of the anionic surfactant, cationic surfactant, amphoteric surfactant and nonionic surfactant may be used. The polymer dispersant may be used too.

Examples of the anionic surfactant available include alkylbenzene sulfonate, alkylphenyl sulfonate, alkylnaphthalene sulfonate, higher fatty acid salts, sulfate ester salt of higher fatty acid esters, sulfonate salts of higher fatty acid esters, sulfate ester salts or sulfonate salts of higher alcohol ethers, higher alkyl sulfosuccinate, higher alkyl phosphate ester salts and phosphate ester salts of higher alcohol-ethylene oxide adducts. Examples of the effectively used anionic surfactant also include dodecylbenzene sulfonate, alkylbenzene sulfonate, isopropylnaphthalene sulfonate, monobutylphenylphenol monosulfonate, monobutylbiphenyl sulfonate and dibutylphenylphenol disulfonate.

Examples of the nonionic surfactant include polypropyleneglycol-ethylene oxide adduct, polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylolamide, acetyleneglycol, acetyleneglycol-oxyethylene adduct, aliphatic alkanolamide, glycerin ester and sorbitan ester.

Examples of the cationic surfactant include tetraammonium alkyl salts, alkylamine salts, benzalkonium slats, alkyl pyridium salts and imidazolium salts, for example dihydroxyethyl stearylamine, 2-heptadecenyl-hydroxyethyl imidazoline, lauryldimethylbenzyl ammonium chloride, cetylpyridium chloride, and stearamide methylpyridium chloride.

Bio-surfactants such as spicrispolic acid, rhamnolipid and lysolecithin may be also used.

The content of the surfactant added in the liquid of the present invention is preferably not more than 10% by mass, more preferably not less than 0.01% by mass and not more than 5% by mass, further more preferably not less than 0.01% by mass and not more than 3% by mass. The optical density and stable storability of the pigment ink may be deteriorated when the content of surfactant is not less than 10% by mass.

Other additives such as polyethylenimine, polyamines, polyvinyl pyrrolidone, polyethyleneglycol, cellulose derivatives including ethyl cellulose and carboxymethyl cellulose, polysaccharides and their derivatives, as well as water soluble polymers, polymer emulsions including acrylic polymer emulsions, polyurethane polymer emulsions and hydrophilic latex, hydrophilic polymer gel, cyclodextrin, macrocyclic amines, dendrimers, crown ethers, urea and derivatives thereof, acetamide, silicone-containing surfactants and fluorine-containing surfactants may be used for controlling characteristics such as improvement of ejectability. Alkali metal compounds such as potassium hydroxide, sodium hydroxide and lithium hydroxide; nitrogen-containing compounds such as ammonium hydroxide, triethanolamine, diethanolamine, ethanolamine and 2-amino-2-methyl-1-propanol; alkali earth metal compounds such as calcium hydroxide; acids such as sulfuric acid, hydrochloric acid and nitric acid; and salts between strong acids and alkalescents such as ammonium sulfate may be used for controlling the pH and conductivity.

Additives such as a pH buffer, an antioxidant, a fungicide, a viscosity control agent, a conductive agent and a UV absorber may be also added, if necessary.

The recording medium of the present invention may be used not only for usual ink jet recording apparatuss but also for a recording apparatus mounting a heater for controlling drying of the ink, and for a recording apparatus mounting an intermediate transfer mechanism by which images are transferred onto the recording medium such as a paper sheet after printing the image on an intermediate transfer member.

The quantity of each of the first and second liquids per one drop is preferably not more than 25 ng, more preferably not less than 0.5 ng and not more than 20 ng, and further preferably not less than 2 ng and not more than 8 ng in the present invention. Feathering may be worsened when the quantity of the liquid per one drop exceeds 25 ng. Because the contact angle of the first and second inks to the recording medium changes depending on the quantity of the ink in one drop, the ink tends to be spread on the surface of the paper sheet when the quantity of the ink in one drop increases.

However, the quantity of the ink in one drop refers to the minimum quantity of the ink in one drop capable of printing in an ink jet printer that is able to eject plural drops having different volumes with each other from one nozzle.

The first and second liquids are preferably applied so that the inks contact each other on the recording medium. The inks are coagulated by the action of the coagulant by allowing the first and second liquid to contact each other to afford a recording method excellent in the optical density, feathering and intercolor bleeding. The liquids may be applied either in adjoining relation one another, or so that one of the liquid covers the other liquid.

The first liquid is applied after the second ink has been applied on the recording medium, since applying the second liquid at first permits the components in the first liquid to be effectively coagulated. While the first liquid may be applied at any time so long as the second liquid has been applied, the first ink is applied at a time of not longer than 0.1 second after the second liquid has been applied.

The proportion of the quantity of first ink to the quantity of the second ink required for forming one pixel is preferably 1:10 to 10:1, more preferably 1:5 to 5:1. Coagulation would be insufficient when the proportion of the quantity of application of the first ink to the quantity of application of the second ink is less than 0.1 or more than 10, to decrease the optical density and to deteriorate feathering and intercolor bleeding. The term "pixel" as used herein refers to a lattice point when a desired image is divided into minimum distance that is able to apply the ink in the principal scanning direction and sub-scanning direction of the image. The image is formed by controlling the color and image density by applying a proper quantity of the ink set for each pixel.

The thermal ink jet method or piezo ink jet method is preferably employed from the view point of improving feathering and intercolor bleeding. Although the mechanism is not entirely clear, it is conjectured to be as follows. When the thermal ink jet recording method is employed, it is conjectured that feathering and intercolor bleeding are improved. The viscosity of the ink at the time of ejection of the ink is reduced by heating, but the viscosity of the ink rapidly increases on the recording medium since the ink is cooled on the recording medium. On the other hand, when the piezoelectric method is employed, a high viscosity liquid can be ejected, and the high viscosity liquid is suppressed from spreading in the radial direction on the surface of the recording medium. Consequently, those methods are conjectured to be effective for improving feathering and intercolor bleeding.

While favorable embodiments of the ink jet recording apparatus of the present invention is described in detail hereinafter, the present invention is by no means restricted to these embodiments.

The recording apparatus in the embodiment of the present invention is constructed so as to be able to be operated so that the image is formed according to the image forming method (ink jet recording method) of the present invention. The recording apparatus mainly comprises an external cover, a tray capable of mounting a predetermined number of recording media such as regular paper sheets, a conveyer roller (convey means) for conveying the recording media one after another into the recording apparatus, and an image forming part (image forming means) for forming the image by ejecting the inks and liquid composition on the surface of the recording medium.

The conveyer roller comprises a pair of the rollers rotatably disposed within the recording apparatus. The conveyer roller holds the recording medium piled on the tray, and conveys a predetermined number of the recording media one after another at a given timing.

The image is formed on the surface of the recording medium in an image forming part. The image forming part mainly comprises a recording head, an ink tank set, a power and signal supply cable, a carriage, a guide rod, a timing belt, a driving pulley and a maintenance unit.

The ink tank set comprises ink tanks ejectably filled with the each of the first and the second liquids.

The power and signal supply cable and the ink tank set are connected to the recording head, which sucks a predetermined amount of the inks from each tank of the ink tank set and ejects on the surface of the recording medium when external image forming information is given to the recording head through the power and signal supply cable. The power and signal supply cable is responsible for supplying image forming information as well as a power required for driving the recording head.

The recording head is disposed by being held on the carriage, which is connected to the guide rod and timing belt connected to the driving pulley. Such construction permits the recording head to move in a direction Y (main scanning direction) parallel to the surface of the recording medium and perpendicular to the convey direction X (sub-scanning direction) of the recording medium.

The recording apparatus also comprises a control means for controlling the drive timing between the recording head and the carriage based on image forming information. Consequently, images based on image forming information can be continuously formed in a predetermined area on the surface of the recording medium conveyed at a predetermined speed along the X-direction.

The maintenance unit is connected to an evacuation device through a tube. The maintenance unit is also connected to the nozzle portion of the recording head, and serves for sucking the ink from the nozzle of the recording head by evacuating within the nozzle of the recording head. Providing the maintenance unit permits excess inks adhered on the nozzle to be removed during the operation of the recording apparatus, if necessary, or permits the inks to be suppressed from being evaporated when the recording apparatus is not operated. However, the maintenance unit is preferably constructed so that the first liquid and second liquid are independently accommodated one another since coagulated particles are formed by mixing the first liquid and the second liquid.

For example, the present invention provides an ink set for ink jet recording that is excellent in the optical density, loss of color-edge definition, loss of color-edge definition between colors, drying time and long-term ejectability, and an ink jet recording method and ink jet recording apparatus using the ink set.

EXAMPLES

Examples of the present invention will be described in detail hereinafter.

<Method for Treating the Pigment>

An aqueous sulfanilic acid solution is warmed, and 100 g of the pigment is added with stirring. The mixed solution is cooled to room temperature with stirring, and 14 g of conc. nitric acid is added dropwise. Further added is 10 g of an aqueous $NaNO_2$ solution, and the solution is stirred until the reaction has been completed. The pigment obtained is desalted and, after adding ion-exchange water so that the concentration of the surface-treated pigment is 12% by mass and adjusting the pH to 7.5, the pigment is dispersed with an ultrasonic homogenizer. The dispersion solution is centrifuged (at 8,000 rpm for 30 minutes) using a centrifuge, and residues (20% by mass to the total quantity) are removed.

<Preparation of Liquid>

Appropriate quantities of a colorant solution, a water-soluble organic solvent, a surfactant and ion-exchange water are added, and the solution is mixed by stirring. The solution obtained is filtered through a 5 μm filter to obtain a desired liquid.

(Liquid A)

| | |
|---|---|
| Carbojet-300 (trade name, manufactured by Cabot Corporation, self-dispersible pigment having carboxylate groups) | 4% by mass |
| Styrene-acrylic acid-sodium acrylate copolymer | 0.5% by mass |
| Diethyleneglycol | 15% by mass |
| Glycerin | 5% by mass |
| Urea | 5% by mass |
| Acetyleneglycol-ethylene oxide adduct | 0.2% by mass |
| Ion-exchange water | balance |

The liquid had a pH of 8.8, a volume average particle diameter of 87 nm, a surface tension of 31 mN/m, and a viscosity of 2.7 mPa·s.

(Liquid B)

| | |
|---|---|
| Cabojet-200 (trade name, manufactured by Cabot Corporation, self-dispersible pigment having sulfonate groups) | 4% by mass |
| Styrene-acrylic acid-sodium acrylate copolymer | 0.5% by mass |
| Diethyleneglycol | 15% by mass |
| Glycerin | 5% by mass |
| Urea | 5% by mass |
| Acetyleneglycol-ethylene oxide adduct | 1% by mass |
| Ion-exchange water | balance |

The liquid had a pH of 8.9, a volume average particle diameter of 95 nm, a surface tension of 31 mN/m, and a viscosity of 2.8 mPa·s.

(Liquid C)

| | |
|---|---|
| Mogul L (trade name, manufactured by Cabot Corporation, pigment having no surface functional groups) | 4% by mass |
| Styrene-acrylic acid-sodium acrylate copolymer | 0.5% by mass |
| Diethyleneglycol | 15% by mass |
| Diglycerin-ethylene oxide adduct | 5% by mass |
| Urea | 5% by mass |
| Isopropyl alcohol | 3% by mass |
| Ion-exchange water | balance |

The liquid had a pH of 8.4, a volume average particle diameter of 115 nm, a surface tension of 48 mN/m, and a viscosity of 2.8 mPa·s.

(Liquid D)

| | |
|---|---|
| Diethyleneglycol | 20% by mass |
| 2-pyrrolidone-5-carboxylic acid (the compound represented by the general formula (1)) | 1% by mass |
| Sodium hydroxide | 0.25% by mass |
| Acetyleneglycol-ethylene oxide adduct | 1% by mass |
| Ion-exchange water | balance |

The liquid had a pH of 4.1, a surface tension of 31 mN/m, and a viscosity of 1.8 mPa·s.

(Liquid E)

| | |
|---|---|
| Diethyleneglycol | 20% by mass |
| 2-pyrrolidone-5-carboxylic acid (the compound represented by the general formula (1)) | 0.15% by mass |
| Sodium hydroxide | 0.015% by mass |
| Acetyleneglycol-ethylene oxide adduct | 1% by mass |
| Ion-exchange water | balance |

The liquid had a pH of 2.8, a surface tension of 31 mN/m, and a viscosity of 1.8 mPa·s.

(Liquid F)

| | |
|---|---|
| Diethyleneglycol | 20% by mass |
| 2-pyrrolidone-5-carboxylic acid (the compound represented by the general formula (1)) | 1% by mass |
| Sodium hydroxide | 0.05% by mass |
| Acetyleneglycol-ethylene oxide adduct | 1% by mass |
| Ion-exchange water | balance |

The liquid had a pH of 2.2, a surface tension of 31 mN/m, and a viscosity of 1.9 mPa·s.

(Liquid G)

| | |
|---|---|
| Diethyleneglycol | 20% by mass |
| 2-pyrrolidone-5-carboxylic acid (the compound represented by the general formula (1)) | 0.005% by mass |
| Sodium hydroxide | 0.0016% by mass |
| Acetyleneglycol-ethylene oxide adduct | 1% by ass |
| Ion-exchange water | balance |

The liquid had a pH of 7.0, a surface tension of 31 mN/m, and a viscosity of 1.7 mPa·s.

(Liquid H)

The liquid is prepared by the predetermined method using a pigment treated according to the method for treating the dye.

| | |
|---|---|
| C.I. Pigment Blue 15:3 (self-dispersible pigment having sulfonate groups) | 4% by mass |
| Diethyleneglycol | 15% by mass |
| Propyleneglycol | 5% by mass |
| Urea | 3% by mass |
| Acetyleneglycol-ethylene oxide adduct | 1% by mass |
| Furan carboxylic acid (the compound represented by the general formula (1)) | 1% by mass |
| Sodium hydroxide | 0.2% by mass |
| Ion-exchange water | balance | the liquid had a pH of 4.2, a volume average particle diameter of 75 nm, a surface tension of 36 mN/m, and a viscosity of 2.2 mPa·s.

(Liquid I)

The liquid is prepared by the predetermined method using a pigment treated according to the method for treating the dye.

| | |
|---|---|
| C.I. pigment blue 15:3 (self-dispersible pigment having sulfonate groups) | 4% by mass |
| Diethyleneglycol | 15% by mass |
| Thiodiglycol | 5% by mass |
| Sulfolane | 5% by mass |
| Urea | 3% by mass |
| Acetyleneglycol-ethylene oxide adduct | 1% by mass |
| 2-pyrrolidone-5-carboxylic acid (the compound represented by the general formula (1)) | 1% by mass |
| Sodium hydroxide | 0.4% by mass |
| Ion-exchange water | balance |

The liquid had a pH of 8.5, a volume average particle diameter of 82 nm, a surface tension of 34 mN/m, and a viscosity of 2.1 mPa·s.

(Liquid J)

The liquid is prepared by the predetermined method using a pigment treated according to the method for treating the pigment.

| | |
|---|---|
| C.I. Pigment Blue 15:3 (self-dispersible pigment having sulfonate groups) | 4% by mass |
| Diethyleneglycol | 10% by mass |
| Triethyleneglycol | 5% by mass |
| Glycerin | 5% by mass |
| Urea | 3 by mass |
| Acetyleneglycol-ethylene oxide adduct | 1% by mass |
| 2-pyrrolidone-5-carboxylic acid (the compound represented by the general formula (1)) | 1% by mass |
| Sodium hydroxide | 0.35% by mass |
| Ion-exchange water | balance |

The liquid had a pH of 7.8, a volume average particle diameter of 84 nm, a surface tension of 31 mN/m, and a viscosity of 2.2 mPa·s.

(Liquid K)

| | |
|---|---|
| C.I. Acid Blue 9 (dye) | 3.5% by mass |
| Diethyleneglycol | 10% by mass |
| 1,5-pentanediol | 5% by mass |
| Diethyleneglycol monobutyl ether | 5% by mass |
| Acetyleneglycol-ethylene oxide adduct | 1% by mass |
| Sodium hydroxide | 0.3% by mass |
| Pyrrole carboxylic acid (the compound represented by by the general formula (1)) | 1% by mass |
| Urea | 3% by mass |
| Ion-exchange water | balance |

The liquid had a pH of 4.2, a surface tension of 30 mN/m, and a viscosity of 1.9 mPa·s.

(Liquid L)

The liquid is prepared by the predetermined method using a pigment treated according to the method for treating the pigment.

| | |
|---|---|
| C.I. Pigment Red 122 (self-dispersible pigment having sulfonate groups) | 4% by mass |
| Diethyleneglycol | 10% by mass |
| N-methyl-2-pyrrolidone | 5% by mass |
| Sulfolane | 5% by mass |
| Urea | 3% by mass |
| Acetyleneglycol-ethylene oxide adduct | 1% by mass |
| Coumaric acid (the compound represented by the general formula (1)) | 1% by mass |
| Sodium hydroxide | 0.25% by mass |
| Ion-exchange water | balance |

The liquid had a pH of 4.4, a volume average particle diameter of 153 nm, a surface tension of 31 mN/m, and a viscosity of 2.5 mPa·s.

(Liquid M)

The liquid is prepared by the predetermined method using a pigment treated according to the method for treating the pigment.

| | |
|---|---|
| C.I. Pigment Yellow 128 (self-dispersible pigment having sulfonate groups) | 4% by mass |
| Diethyleneglycol | 15% by mass |
| Diethyleneglycol monobutylether | 5% by mass |
| Urea | 3% by mass |
| Acetyleneglycol-ethylene oxide adduct | 1% by mass |
| Furan carboxylic acid (the compound represented by the general formula (1)) | 1% by mass |
| Sodium hydroxide | 0.25% by mass |
| Ion-exchange water | balance |

The liquid had a pH of 4.5, a volume average particle diameter of 180 nm, a surface tension of 33 mN/m, and a viscosity of 2.7 mPa·s.

(Liquid N)

The liquid is prepared by the predetermined method using a pigment treated according to the method for treating the pigment.

| | |
|---|---|
| C.I. Pigment Blue 15:4 (self-dispersible pigment having sulfonate groups) | 4% by mass |
| Diethyleneglycol | 15% by mass |
| Diethyleneglycol monobutylether | 5% by mass |
| Urea | 3% by mass |
| Acetyleneglycol-ethylene oxide adduct | 1% by mass |
| Ion-exchange water | balance |

The liquid had a pH of 7.5, a volume average particle diameter of 86 nm, a surface tension of 31 mN/m, and a viscosity of 2.2 mPa·s.

(Liquid O)

The liquid is prepared by the predetermined method using a pigment treated according to the method for treating the pigment.

| | |
|---|---|
| C.I. Pigment Yellow 128 (self-dispersible pigment having sulfonate groups) | 4% by mass |
| Diethyleneglycol | 15% by mass |
| Diethyleneglycol monobutylether | 5% by mass |
| Urea | 3% by mass |
| Acetyleneglycol-ethylene oxide adduct | 1% by mass |
| Ion-exchange water | balance |

The liquid had a pH of 7.5, a volume average particle diameter of 119 nm, a surface tension of 31 mN/m, and a viscosity of 2.2 mPa·s.

(Liquid P)

The liquid is prepared by the predetermined method using a pigment treated according to the method for treating the pigment.

| | |
|---|---|
| C.I. Pigment Red 122 (self-dispersible pigment having sulfonate groups) | 4% by mass |
| Diethyleneglycol | 15% by mass |
| Diethyleneglycol monobutylether | 5% by mass |
| Urea | 3% by mass |
| Acetyleneglycol-ethylene oxide | 1% by mass |
| Ion-exchange water | balance |

The liquid had a pH of 7.8, a volume average particle diameter of 99 nm, a surface tension of 31 mN/m, and a viscosity of 2.3 mPa·s.

(Liquid Q)

| | |
|---|---|
| Diethyleneglycol | 20% by mass |
| Acetyleneglycol-ethylene oxide | 1% by mass |
| Magnesium nitrate (multivalent metal salt) | 10% by mass |
| Urea | 3% by mass |
| Ion-exchange water | balance |

The liquid had a pH of 6.8, a surface tension of 30 mN/m, and a viscosity of 1.5 mPa·s.

<Evaluation Method>

Figure 2:
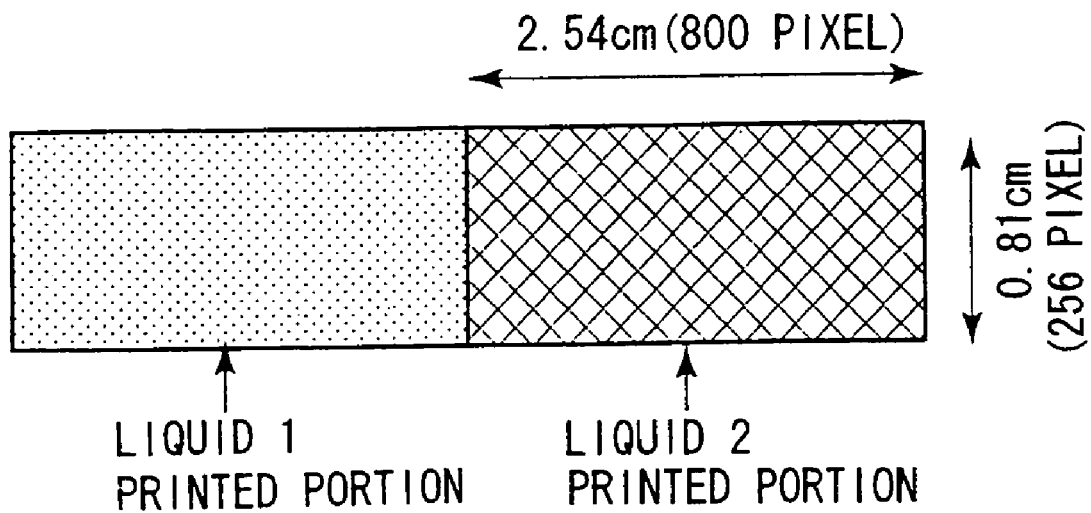
FIG. 2 also shows another printing pattern for evaluation in an example.
Figure 3:
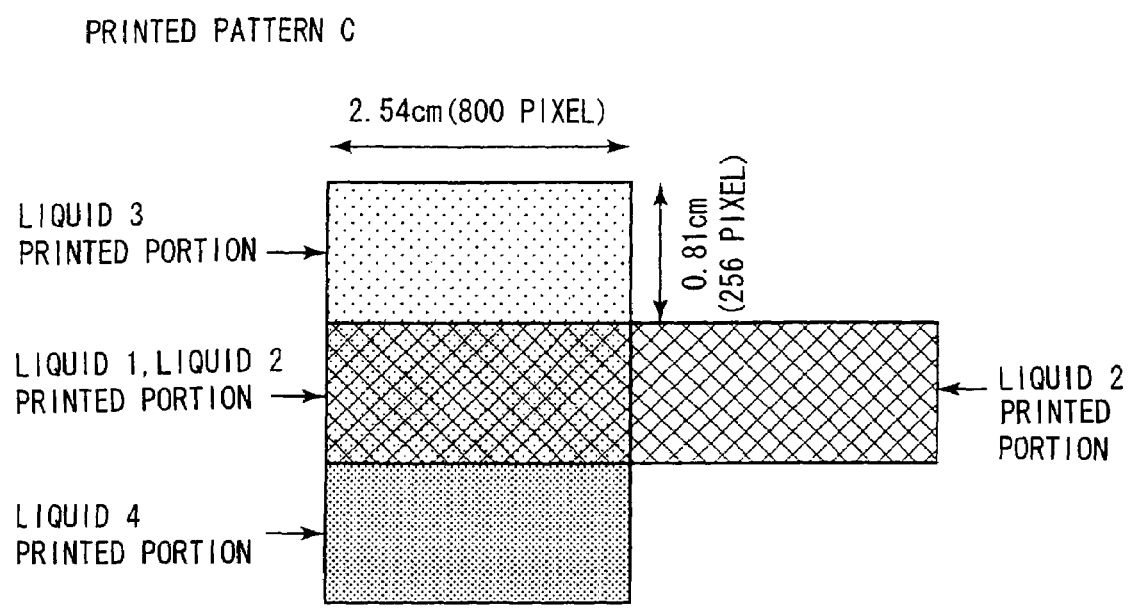
FIG. 3 shows a different printing pattern for evaluation in an example.

The second liquid is ejected on a FX-P paper sheet (manufactured by Fuji Xerox Co.) using a test print head with a nozzle number of 256 and resolution of 800 dpi, and the first liquid is ejected on the printed image with the second liquid. The image is printed in a normal environment (at a temperature of 23±0.5° C. and a humidity of 55±5% R.H.). The samples after allowing to leave for 24 hours after printing in a normal environment are evaluated based on the printed patterns shown in FIGS. 1 to 3.

<<Optical Density>>

The optical density of the printed image is measured with X-Rite 404 (trade name, manufactured by X-Rite Co.). When the printed pattern does not satisfy the criteria shown below at any printed portions, the pattern is evaluated to be a lower level (for example, when the pattern is evaluated as "A" at a printer portion and evaluated as "B" at another printed portion, the sample is evaluated as "B"). The criteria are the same in any of other evaluation methods below.

—Evaluation Criteria (Black Ink)—

A: Optical density of not less than 1.4.

B: Optical density of not less than 1.3 and less than 1.4.

C: Optical density of less than 1.3.

—Evaluation Criteria (Color Ink)—

A: Optical density of not less than 1.1.

B: Optical density of not less than 1.0 and less than 1.1.

C: Optical density of less than 1.0.

<<Intercolor Bleeding>>

Adjoining patterns having different colors one another are printed, and intercolor bleeding is visually evaluated by comparing the extent of feathering between the two different color patterns with a limiting sample.

—Evaluation Criteria—

A: Little feathering.

B: Feathering of the permissible level.

C: Sever feathering out of the range of the permissible level.

<<Feathering>>

Monochromatic fine line patterns are printed, and feathering of the printed patterns is visually evaluated by comparing the extent of feathering with a limiting sample.

—Evaluation Criteria—
A: Little feathering.
B: Feathering of the permissible level.
C: Sever feathering out of the range of the permissible.

<<Drying Time>>

A 100% coverage pattern is printed on a FX-P paper sheet, and another FX-P paper sheet is pressed onto the printed sheet at a predetermined time after printing with a load of $1.9 \times 10^4$ N/m². The time when the ink is not transferred to the pressed FX-P ink is defined to be the drying time.

—Evaluation Criteria—
A: A drying time of less than 3 seconds.
B: A drying time of not less than 3 seconds and less than 10 seconds.
C: A drying time of not less than 10 seconds.

<<Long-Term Reliability>>

The long-term reliability is judged based on the changes of the ink ejection speed over time. The ink ejection speed is measured at an initial state. Then, the ink ejection speed is measured again after printing with $1 \times 10^8$ pulses of ejection. The proportion of the ink ejection speed at the initial state to the ink ejection speed after $1 \times 10^8$ pulses of ejection is calculated, and the long-term reliability is evaluated according to the following criteria.

—Evaluation Criteria—
A: The ejection speed after $1 \times 10^8$ pulses of ejection is not less than 90% of the initial ejection speed.
B: The ejection speed after $1 \times 10^8$ pulses of ejection is not less than 75% and less than 90% of the initial ejection speed.
C: The ejection speed after $1 \times 10^8$ pulses of ejection is less than 75% of the initial ejection speed.

<Summary of the Results of Criteria>

The results of criteria are summarized in Tables 1 and 2.

As shown in Tables 1 and 2, the optical density, feathering, intercolor bleeding, drying time and long-term ejectability are excellent in Examples 1 to 11 in which the second liquid contains the compound represented by the general formula (1), and the first and second liquid are applied on the recording medium so as to contact each other.

As hitherto described, the present invention provides an ink set for ink jet recording excellent in the optical density, feathering, intercolor bleeding, drying time and long-term ejectability, and an ink jet recording method and ink jet recording apparatus using the ink set.

What is claimed is:

1. An ink set for ink jet recording comprising at least a first liquid and a second liquid, wherein:
    the first liquid comprises at least a colorant, a water soluble solvent and water; and
    the second liquid comprises at least a compound represented by the following general formula (1), a water soluble solvent and water:

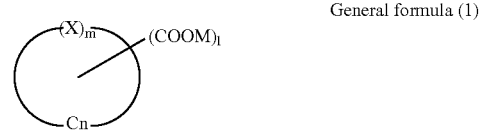

General formula (1)

in which X represents O, CO, NH, NR, S or $SO_2$; R represents an alkyl group; M represents a hydrogen atom, an alkali metal or an amine; l represents an integer from 1 to 5; m represents 1 or 2; and n represents an integer from 3 to 7.

2. The ink set for ink jet recording according to claim 1, wherein the compound represented by the general formula

TABLE 1

|  | Liquid 1 | Liquid 2 | Printed pattern | Optical density | Feathering of ink | Intercolor bleeding | Drying time | Long-term ejectability |
| --- | --- | --- | --- | --- | --- | --- | --- | --- |
| Example 1 | A | D | A | A | A | A | A | A |
| Example 2 | A | E | A | A | A | A | A | A |
| Example 3 | B | E | B | B | B | A | A | A |
| Example 4 | B | F | B | A | A | A | A | B |
| Example 5 | C | G | A | B | B | B | A | A |
| Example 6 | C | H | A | A | A | A | B | A |
| Example 7 | A | I | A | B | B | B | A | A |
| Example 8 | A | J | A | A | A | A | A | A |
| Example 9 | A | K | A | A | A | A | A | A |
| Comparative example 1 | A | N | A | C | C | A | A | A |
| Comparative example 2 | A | O | A | C | C | A | A | A |
| Comparative example 3 | A | Q | A | A | A | A | A | C |

TABLE 2

|  | Liquid 1 | Liquid 2 | Liquid 3 | Liquid 4 | Printed pattern | Optical density | Feathering of ink | Intercolor bleeding | Drying time | Long-term ejectability |
| --- | --- | --- | --- | --- | --- | --- | --- | --- | --- | --- |
| Example 10 | A | H | L | M | C | A | A | A | A | A |
| Example 11 | A | L | N | O | C | A | A | A | A | A |
| Comparative example 4 | A | N | O | P | C | C | C | C | A | A |

(1) is at least one selected from the group consisting of pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives and salts of these compounds:

3. The ink set for ink jet recording according to claim 1, wherein a pH of the second liquid is not less than 2.5 and not more than 8.0.

4. The ink set for ink jet recording according to claim 1, wherein the second liquid contains the compound represented by the general formula (1) in a proportion of not less than 0.01% by mass and not more than 30% by mass.

5. The ink set for ink jet recording according to claim 1, wherein the colorant in the first liquid is a pigment, and the pigment is at least one selected from the group consisting of a pigment dispersed with a polymer dispersant, a self-dispersible pigment and a pigment coated with a resin.

6. The ink set for ink jet recording according to claim 1, wherein the first liquid contains a resin having carboxylate groups.

7. The ink set for ink jet recording according to claim 1, wherein the second liquid contains at least one colorant selected from the group consisting of a dye, a pigment having sulfonic acid or a sulfonate salt on a surface thereof, and a self-dispersible pigment.

8. The ink set for ink jet recording according to claim 1, wherein a volume average particle diameter of the colorant in the first liquid is not less than 30 nm and not more than 250 nm.

9. The ink set for ink jet recording according to claim 1, wherein a surface tension of the first liquid is not less than 20 mN/m and not more than 60 mN/m.

10. The ink set for ink jet recording according to claim 1, wherein a surface tension of the second liquid is not less than 20 mN/m and not more than 45 mN/m.

11. The ink set for ink jet recording according to claim 1, wherein a viscosity of each of the first and second liquids is not less than 1.2 mPa·s and not more than 8.0 mPa·s.

12. The ink set for ink jet recording according to claim 1, wherein a number of particles having a particle diameter of not less than 5 μm in a mixed liquid of equal amounts of the first and second liquids is not less than 1,000 particles/μL.

13. An ink jet recording method using an ink set for ink jet recording comprising at least two kinds of liquids including a first liquid containing at least a colorant, a water soluble solvent and water, and a second liquid containing at least a compound represented by the general formula (1), a water soluble solvent and water, wherein an image is formed by applying the first and second liquids on a recording medium so as to contact each other;

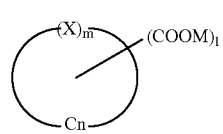

General formula (1)

in which X represents O, CO, NH, NR, S or $SO_2$; R represents an alkyl group; M represents a hydrogen atom, an alkali metal or an amine; l represents an integer from 1 to 5; m represents 1 or 2; and n represents an integer from 3 to 7.

14. The ink jet recording method according to claim 13, wherein the second liquid contains at least one colorant selected from the group consisting of a dye, a pigment having a sulfonic acid or a sulfonate salt on a surface thereof, and a self-dispersible pigment.

15. The ink jet recording method according to claim 13, wherein:
the colorant in the first liquid is a pigment; and
the pigment is at least one pigment selected from the group consisting of a pigment dispersed with a polymer dispersant, a self-dispersible pigment and a pigment coated with a resin.

16. The ink jet recording method according to claim 13, wherein the first liquid and the second liquid are applied on a recording medium in a quantity of not more than 25 ng per one drop.

17. The ink jet recording method according to claim 13, wherein a mass ratio of amounts of the first liquid and the second liquid applied for forming one pixel is in a range of 1:10 to 10:1.

18. An ink jet recording apparatus comprising a recording head for ejecting each liquid in an ink set for ink jet recording, wherein
the ink set for ink jet recording comprises at least a first liquid and second liquid, the first liquid comprising at least a colorant, a water soluble solvent and water, and the second liquid comprising at least a compound represented by the general formula (1), a water soluble solvent and water;

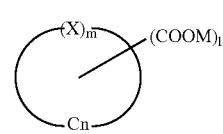

General formula (1)

in which X represents O, CO, NH, NR, S or $SO_2$; R represents an alkyl group; M represents a hydrogen atom, an alkali metal or an amine; l represents an integer from 1 to 5; m represents 1 or 2; and n represents an integer from 3 to 7.

19. The ink jet recording apparatus according to claim 18, wherein the first and second inks are applied on a recording medium so as to contact each other.

20. The ink jet recording apparatus according to claim 18, wherein the second liquid contains at least one colorant selected from the group consisting of a dye, a pigment having at least sulfonic acid and a sulfonate salt as a functional group on a surface thereof, and a self-dispersible pigment.

21. The ink jet recording apparatus according to claim 18, wherein:
the colorant in the first liquid is a pigment; and
the pigment is at least one selected from the group consisting of a pigment dispersed with a polymer dispersant, a self-dispersible pigment and a pigment coated with a resin.

22. The ink jet recording apparatus according to claim 18, wherein the first and second liquids are applied on a recording medium in a quantity of not more than 25 ng per one drop.

23. The ink jet recording apparatus according to claims 18, wherein a mass ratio of amount of the first liquid and the second liquid applied for forming one pixel is in the range of 1:10 to 10:1.

* * * * *